(12) United States Patent
Evans (10) Patent No.: US 8,479,169 B1
(45) Date of Patent: Jul. 2, 2013

(54) CODE ANALYSIS VIA RANGED VALUES

(75) Inventor: Christian Lewis Evans, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 980 days.

(21) Appl. No.: 12/254,406

(22) Filed: Oct. 20, 2008

(51) Int. Cl.
*G06F 9/44* (2006.01)

(52) U.S. Cl.
USPC .................................................. 717/131

(58) Field of Classification Search
USPC .................................. 717/127, 131
See application file for complete search history.

(56) References Cited

U.S. PATENT DOCUMENTS

| | | | | |
|---|---|---|---|---|
| 5,729,676 | A * | 3/1998 | Inoue | 714/38.1 |
| 7,089,542 | B2 * | 8/2006 | Brand et al. | 717/143 |
| 7,168,009 | B2 * | 1/2007 | Darringer et al. | 714/38.1 |
| 7,168,068 | B2 * | 1/2007 | Dawson | 717/130 |
| 7,401,322 | B1 * | 7/2008 | Shagam et al. | 717/128 |
| 7,644,398 | B2 * | 1/2010 | Cleaveland et al. | 717/135 |
| 7,752,609 | B2 * | 7/2010 | Rioux | 717/141 |
| 7,873,945 | B2 * | 1/2011 | Musuvathi et al. | 717/124 |
| 7,904,888 | B2 * | 3/2011 | Berry et al. | 717/128 |
| 2006/0150160 | A1 * | 7/2006 | Taft et al. | 717/126 |
| 2008/0082968 | A1 * | 4/2008 | Chang et al. | 717/128 |
| 2010/0306749 | A1 * | 12/2010 | Rioux | 717/141 |

OTHER PUBLICATIONS

A Simple Value Range Propagation Pass for SUIF-1, Brian Greskamp, Dec. 17, 2003.*
Automatic Test Data Generation using Constraint Solving Techniques, Gotlieb et al., ISSTA 98 Clearwater Beach Florida USA, Copyright 1998 0-89791-971-8/98/0:3.*
Test-Data Generation Using Genetic Algorithms (1999), Pargas et al.*
Automatic, evolutionary test data generation for dynamic software testing, Sofokleous et al., The Journal of Systems and Software 81 (2008) 1883-1898, Available online Jan. 18, 2008.*
Liu, Hui, "Automated Verification and Test Case Generation for Input Validation", AST'06, May 23, 2006, Shanghai, China, 2006 ACM, pp. 29-35.*
Cyrille Artho, "Combining Test Case Generation and Runtime Verification", Theoretical Computer Science, 2004.*
Jane Huffman Hayes, Input validation analysis and testing', Empir Software Eng (2006) 11: 493-522.*

* cited by examiner

*Primary Examiner* — Don Wong
*Assistant Examiner* — Daxin Wu
(74) *Attorney, Agent, or Firm* — Honigman Miller Schwartz and Cohn LLP (57) ABSTRACT

A method, computer program product, and system are provided for reducing errors in software code. For example, an embodiment of the method includes defining a range of values for one or more inputs to the software code and evaluating non-conditional and conditional statements in the software code with one or more values from the range of values until a program misbehavior occurs or substantially all statements in the software code have been evaluated. When evaluating the conditional statements, true and false conditions of the statement can be explored using the range of values. For instance, a sub-set of the range of values can be used to evaluate the conditional statement as true and another sub-set of the range of values can be used to evaluate the conditional statement as false. By exploring both true and false scenarios, wide code coverage is possible.

17 Claims, 4 Drawing Sheets

Figure 1

```
char program (char c) {
    c = c + 1;
    if (c >= 10 && c <= 20) {
        return 1;
    } else {
        return 100 / c;
    }
}
```

201 → char program (char c) {
202 → c = c + 1;
203 → if (c >= 10 && c <= 20) {
204 → return 1;
205 → } else {
206 → return 100 / c;
207 → }
208 → }

Example Software Code 200

CODE ANALYSIS VIA RANGED VALUES

BACKGROUND

1. Field

Embodiments of the present invention generally relate to the field of software code analysis. More specifically, embodiments of the present invention refer to a software code analysis tool with wide code coverage.

2. Background

Software testing is an important component of a software quality assurance process. Software faults can occur from a variety of reasons. For instance, a software fault can occur when a programmer makes an error in software source code. In another instance, a software fault can occur due to hardware environment changes such as the software being run on a new hardware platform. It is the task of software developers and quality assurance engineers to find these faults and provide solutions for these defects in a timely manner. As such, to ensure a timely distribution of high-quality software to consumers, software vendors continually seek methods and analysis tools to improve the software development process.

One conventional technique used to find faults in software code is "fuzz" testing.

Fuzz testing is a form of black-box testing that provides either random data or otherwise deliberately malformed data to inputs. The results of the fuzz test indicate whether the code fails or crashes as a result of the random inputs. However, the randomness of the inputs used in fuzz testing may yield a large amount of false negative errors. False negative errors refer to a scenario where faults exist in code, but the code analyzer fails to report them. In the case of fuzz testing, the likelihood of catching a subtle boundary-value condition in software code with random inputs is highly unlikely.

Another conventional technique used to find faults in software code is static code analysis. Static code analysis refers to an analysis of code without executing the program. Typically, static code analysis is performed on a version of the software code, where the sophistication of the analysis varies based on the level of modeling by the software developer (e.g., mathematical modeling and interpretation of individual statements and declarations in a section of source code or the entire source code). In addition to generating false negatives, the static code analysis technique may also generate a significant number of false positive errors. False positive errors refer to a scenario where the code analyzer reports a fault when a fault does not exist.

SUMMARY

Embodiments of the present invention include a computer-implemented method to analyze errors in software code. The computer-implemented method includes defining a range of values for one or more inputs to the software code, evaluating a non-conditional statement in the software code with one or more values from the range of values, evaluating a conditional statement in the software code with one or more values from the range of values, and outputting an indication regarding an error in the software code. The computer-implemented method can also include storing and/or tracking the one or more values used to evaluate the non-conditional and conditional statements and repeating the evaluation of the non-conditional and conditional statements until a program misbehavior occurs or substantially all statements in the software code have been evaluated. When evaluating the conditional statement, if possible, both true and false conditions of the statements can be evaluated based on the one or more values from the range of values. Further, when evaluating a nested conditional statement, both true and false conditions of the nested conditional statement can be evaluated based on the one or more values from the range of values.

With respect to the defining the range of values step, the range of values can be set according to a variable type of the one or more inputs.

With respect to evaluating the non-conditional statement step, the software code can be evaluated by selecting one or more values from the range of values. The one or more values from the range of values for evaluation of the non-conditional statement can be selected based on test time and/or hardware testing constraints.

With respect to evaluating the conditional statement step, the software code can be evaluated on two or more execution paths by selecting one or more values from the range of values. The software code can be executed along a first path with one or more values from the range of values that evaluate the conditional statement as true and along a second path with one or more values from the range of values that evaluate the conditional statement as false. The one or more values from the range of values for evaluation of the conditional statement can be selected based on test time and/or hardware testing constraints.

With respect to the repeating step, a flag can be used to indicate a program failure or a memory access error in a computer system that evaluates the software code.

Embodiments of the present invention additionally include a computer program product comprising a computer-usable medium having computer program logic recorded thereon for enabling a processor to analyze errors in software code. The computer program code logic includes the following: a first computer readable program code that enables a processor to define a range of values for one or more inputs to the software code; a second computer readable program code that enables a processor to evaluate a non-conditional statement in the software code with one or more values from the range of values; a third computer readable program code that enables a processor to evaluate a conditional statement in the software code with one or more values from the range of values; and, a fourth computer readable program code that enables a processor to output an indication regarding an error in the software code. The computer program logic can also include: a fifth computer readable program that enables a processor to store the one or more values used to evaluate the non-conditional and conditional statements; and, a sixth computer readable program that enables a processor to repeat the evaluation of the non-conditional and conditional statements in the software code until a program failure occurs or substantially all statements in the software code have been evaluated.

Embodiments of the present invention further include a system configured to analyze errors in software code. The system includes the following: a definition module configured to define a range of values for one or more inputs to the software code; a first evaluation module configured to evaluate a non-conditional statement in the software code with one or more values from the range of values; a second evaluation module configured to evaluate a conditional statement in the software code with one or more values from the range of values, where, if possible, true and false conditions of the conditional statement can be evaluated based on the one or more values; and, an output module configured to output an indication regarding an error in the software code.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

DETAILED DESCRIPTION

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the relevant art that the present invention, as described below, can be implemented in many different embodiments of software, hardware, firmware, and/or the entities illustrated in the figures. Any actual software code with the specialized control of hardware to implement embodiments of the present invention is not limiting of the present invention. Thus, the operational behavior of embodiments of the present invention will be described with the understanding that modifications and variations of the embodiments are possible, given the level of detail presented herein.

Figure 1:
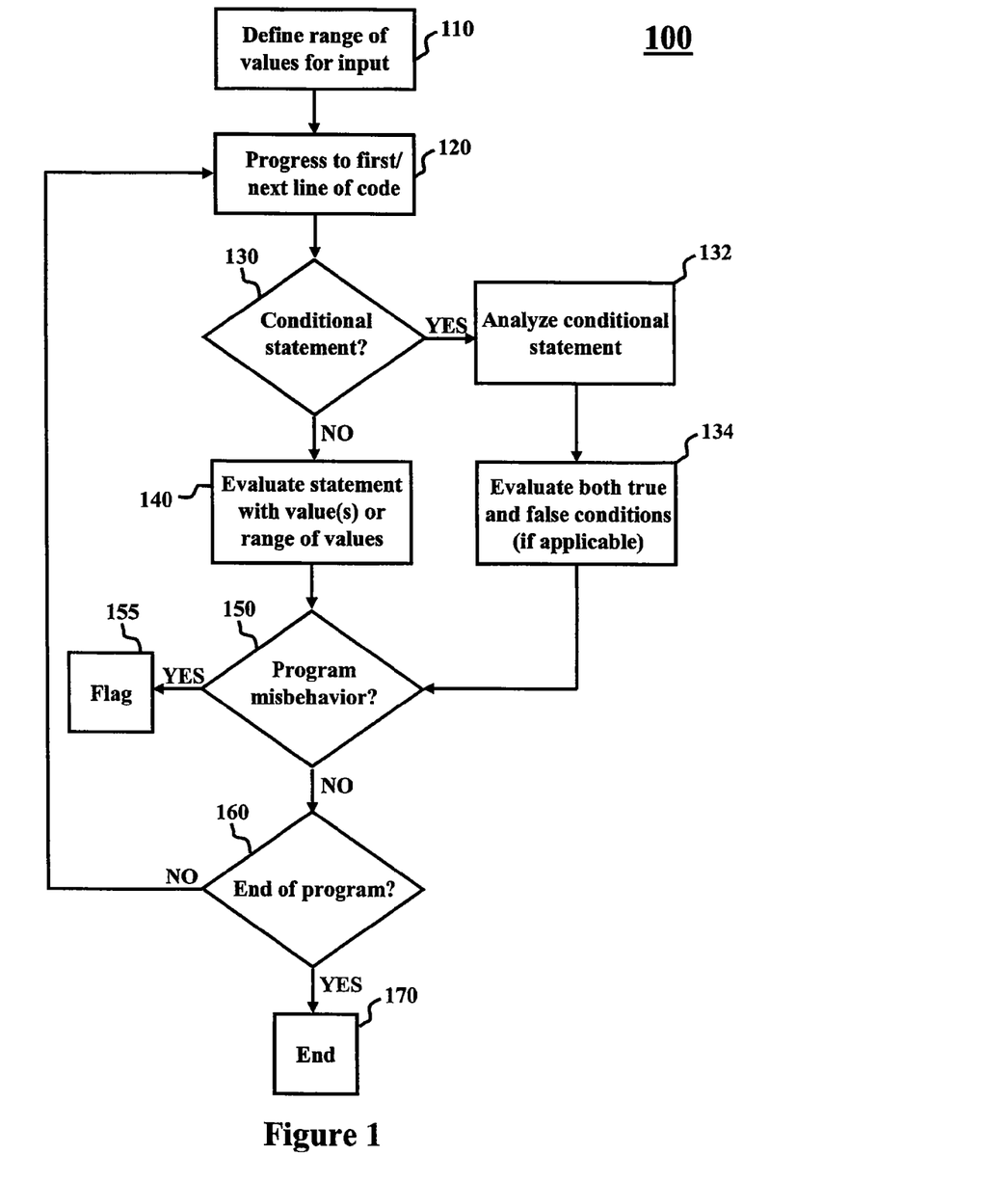
FIG. 1 is an illustration of an embodiment of a method to reduce errors in software code.

FIG. 1 is an illustration of an embodiment of a method 100 to explore branches of a conditional statement in software code. Method 100 generates minimal false positive errors, while also minimizing false negative errors. In an embodiment, method 100 generates zero false positive errors. As a result, method 100 reduces errors in software code.

For instance, in fuzz testing, random or deliberately malformed data are used as inputs to a software program and the results of the fuzz test indicate whether the program fails or crashes as a result of the random inputs. An issue associated with fuzz testing is the degree of code coverage. Software code often contains conditional statements that can produce multiple results depending on an evaluation of the condition. In analyzing software code with fuzz testing techniques, the code's behavior is explored using random or deliberately malformed inputs and, depending on the inputs, conditional statements branch an execution of the code in a particular direction (e.g., if a condition evaluates as true, then the conditional statement branches the execution of the program to one section of code; otherwise, the conditional statement branches the program to another section of code for execution). Fuzz testing, as a result, may yield a large amount of false negative errors since all alternatives and combinations of conditional statements are not explored.

Method 100 can evaluate each branch of a conditional statement in software code, thus providing wide code coverage and a reduction in the number of false negative errors. In addition, embodiments of method 100 can elect not to explore branches of conditional statements that have been evaluated and can bypass one or more levels of nested conditional statements so that complexity of the software analysis can be minimized.

Static code analysis models certain portions of code or the entire code, where conditional statements can be represented by mathematical models to reduce complexity and execution time of the analysis. Depending on the sophistication of the mathematical models, the modeling may indicate a possible program state which is in fact not possible. Static code analysis techniques, as a result, may yield false positive errors due to the modeling nature of the analysis tool.

Method 100 generates inputs to software code and evaluates these inputs using the actual code rather than modeling statements and declarations of the program. As a result, method 100 can reduce false positive errors. In an embodiment, method 100 can also eliminate false positive errors.

Figure 2:
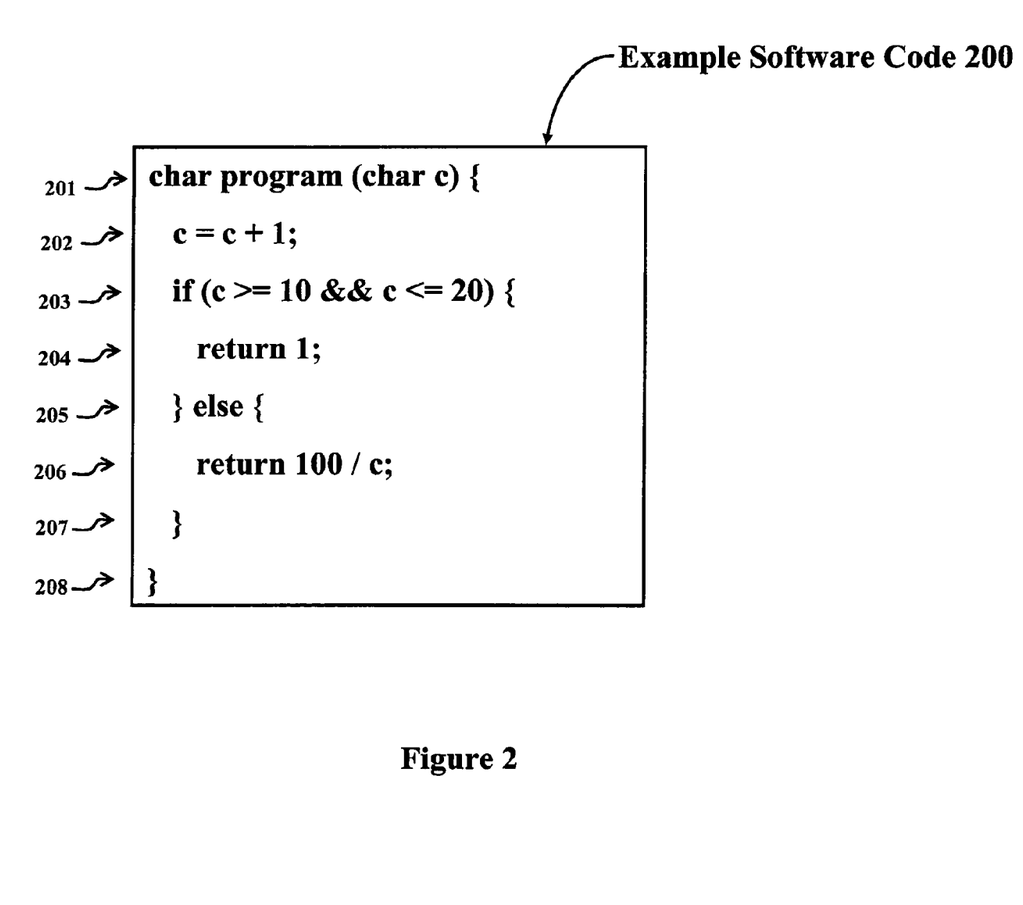
FIG. 2 is an illustration of an example software code used to facilitate in a description of an embodiment of a method to reduce errors in software code.

For ease of explanation, method 100 will be described with reference to example software code. FIG. 2 is an illustration of example software code 200 written in the C programming language. A person skilled in the relevant art will recognize, based on the description herein, that method 100 can be used in a wide variety of software code applications and that these applications can be programmed in other programming languages, such as, for example and without limitation, $C^{++}$ and Java.

In FIG. 2, software code 200 receives a user input and, based on the input, either outputs a '1' or a value equal to '100' divided by the input value. Line 201 is programmed to receive an input 'c' with a data type 'char'. In this example, data type 'char' ranges in value from −128 to 127. In line 202, code 200 increments a value of input 'c' by 1. In line 203, code 200 analyzes a conditional 'if' statement to assess whether 'c' is greater than or equal to '10' and less than or equal to '20' and, if true, code 200 branches to line 204. Line 204 outputs a '1' if the condition in line 203 is true. If the conditional statement in line 203 is false (e.g., 'c' is not between the values of 10 and 20, inclusive), then code 200 branches to the 'else' statement in line 205. The 'else' statement in line 205 executes the statement programmed in line 206, which returns a value of '100/c'.

In referring to method 100 in FIG. 1, step 110 defines a range of values for one or more inputs to the software program. For instance, in referring to exemplary software code 200, line 201 is programmed to receive an input 'c' that is a data type 'char', which has a range of values from −128 to 127. Here, the input values can be one or more values in the range [−128 to 127]. In an embodiment, the input value is a distinct value in the range [−128 to 127]. In the alternative, as a person skilled in the relevant art will recognize, other data types and their respective ranges of values can be used such as, for example and without limitation, 16-bit signed integer (e.g., [−32768 to 32767]), float (e.g., [3.4e−38 to 3.4e+38]), and double (e.g., [1.7e−308 to 1.7e+308]).

Step 120 progresses to the first or next line of the software code. For instance, in exemplary software code 200, line 201 would be the first line of code.

Step 130 assesses whether a statement in the software code is a conditional statement. A conditional statement is a feature of a programming language which performs a different computation or action depending on whether a programmerspecified condition evaluates to true or false. An example of a conditional statement is an 'if-then-else' construct. If the condition associated with the 'if' statement evaluates as true, then statements associated with the 'if' statement (e.g., line 204 in example software code 200) are evaluated. If the condition associated with the 'if' evaluates as false, then statements associated with the 'else' statement (e.g., line 206 in example software code 200) are evaluated. A person skilled in the relevant art will recognize that conditional statements can be expressed using other programming constructs and in other programming languages.

If the line of code is not a conditional statement, step 140 evaluates the program statement with one or more values from the range of values defined in step 110. For instance, in referring to example software code 200, line 201 increments the range of values by '1'. That is, since 'c' has a range of values [−128 to 127], line 201 receives each value in the range and increments the value by '1' to generate a new range of values [−128 to 127] (note that if the range [−128 to 127] is incremented by '1', then the resulting range would be [−127 to 128]; however, the value '128' cannot be represented as a data type 'char' and as such, the range wraps around to provide a value of '−128' to provide the original range of [−128 to 127]). This range of values is then processed by the remaining lines of code.

In an embodiment, one or more values from the range of values can be selected to evaluate the program statement in step 140. For instance, in a software code example that includes multiple inputs, a range of values can be defined for each input. In a mathematical operation such as, for example, multiplication that involves the multiple inputs, a multiplication of two or more ranges may be computed and result in a computationally complex operation. A method to reduce this computational complexity would be to select one or more values from each range of values to participate in the multiplication operation, according to an embodiment of the present invention.

Step 150 assesses whether a program misbehavior has occurred as a result of executing the program statement. An example of program misbehavior can be a memory access error in a system executing the software code or a program failure. Program misbehavior is an important debug feature for quality assurance engineers since information extracted from the misbehavior (e.g., code location of the misbehavior and program states generating the misbehavior) can be used in debugging the code. If program misbehavior has occurred, then step 155 raises a flag to indicate the misbehavior. An example of the flag used in step 155 can be an indicator that alerts a quality assurance engineer of the misbehavior.

In an embodiment, the one or more values used to evaluate the program statement in step 140 can be stored in, for example, memory. In another embodiment, variables in a software code can be used to store the one or more values. This information can be useful to a quality assurance engineer in tracking performance of the software code. For instance, the quality assurance engineer can use the information to locate a program state of where a program misbehavior occurred and generate further tests to validate the particular portion of software code.

If there is no program misbehavior, then step 160 assesses whether an end of a program has been reached. If so, then step 170 indicates the end of the software code. If not, then step 120 progresses to the next statement in the software code.

If it is determined in step 120 that the next statement is a conditional statement, then method 100 performs step 132. Step 132 analyzes a branch of a conditional statement. In an embodiment, step 132 analyzes values from the range of inputs defined in step 110 (and prior program statements, if applicable) that evaluate the condition to be, if possible, true and false. Once values are chosen to evaluate the software program in two or more different execution paths, step 134 evaluates the conditional statement with 'true' and 'false' conditions (if applicable). Based on the description herein, a person skilled in the relevant art will recognize that, depending on the conditional statement, the range of values defined in step 110 may not evaluate the conditional statement as both 'true' and 'false'. An exemplary method to evaluate code according to 'true' and 'false' conditions can be found in "Code Analysis Via Dual Branch Exploration" (U.S. patent application Ser. No. 12/254,419, filed Oct. 20, 2008).

For instance, in referring to example software code 200, a value of '15' evaluates the condition '(c>=10 && c<=20)' in the 'if-then-else' statement (i.e., lines 203-207 in example software code 200) as 'true' and a value outside the range [10 to 20] (but within the range defined in step 110 and prior program statements, if applicable) evaluates the condition as 'false'.

In an embodiment of step 132, the conditional statement can be evaluated for each value contained in the range of values defined in step 110 (and prior program statements, if applicable). For instance, in referring to example software code 200, the conditional statement in line 203 can be evaluated for the range of values [−128 to 127], which is generated as a result of line 202 as described above with respect to step 140. In line 203 of example software code 200, a value between 10 and 20 from the range of values [−128 to 127] evaluates the condition as true and returns a value of '1' in line 204. On the other hand, a value outside the range [10 to 20] evaluates the condition as false and returns a value of '100/c'. In this scenario, step 134 can evaluate lines 205-207 in example software code 200 with the remaining values from range [−128 to 127] (i.e., [−128 to 9] and [21 to 127]). Essentially, the range of values evaluated for the false condition is any possible value, within the range of values, apart from [10 to 20].

In reference to line 203 in example software code 200 and its respective range [10 to 20], an embodiment of step 132 can select one or more random values from the range of values to evaluate the 'if' statement. For instance, values '14' and '17' can be chosen to evaluate the 'if' statement in line 203.

Similarly, in reference to lines 205-207 in example software code 200 and its respective ranges of values [−128 to 9] and [21 to 127], an embodiment of step 132 can select one or more random values from these ranges of values to evaluate the 'else' statement. For instance, values '−128' and '127' can be chosen to evaluate the 'else' statement since these values represent the minimum and maximum values of the combined ranges. In the alternative, values '0' and '1' can be chosen to evaluate the 'else' statement since these values lie approximately in the middle of the two ranges. In this example, if the value '0' is chosen to evaluate the 'else' statement, then a program misbehavior would occur in step 150 since execution of the statement 'return 100/c' (line 206 in example software code 200) would generate a program error. As such, a flag in step 155 would indicate the program misbehavior.

In an embodiment, the one or more values used to evaluate the conditional statement in step 132 and 134 can be stored in, for example, memory. In another embodiment, variables in a software code can be used to store the one or more values A person skilled in the relevant art will recognize that other values in the range of values can be chosen to evaluate the conditional statement described above. The values in the range of values that are chosen to be evaluated in the conditional statement can be implementation-specific. For instance, a quality assurance engineer can decide to limit the number of values to two values, where the two values represent minimum and maximum values in one or more ranges of values. In the alternative, as would be understood by a person skilled in the relevant art, the quality assurance engineer can also implement a variety of schemes to choose values from the one or more ranges of values to be evaluated in the conditional statement. Further, the one or more values chosen to analyze the statement can be executed in a serial manner (e.g., one value executed at a time) or, in the alternative, the values can be executed in parallel (e.g., two more values executed simultaneously), as would be understood by a person skilled in the relevant art.

A person skilled in the relevant art will also appreciate that all values in the range of values defined by step 110 and prior program statements (if applicable) can be evaluated by step 134 or in the alternative, a sub-set of the range of values can be used. For example, in reference to example software code 200, all values in the range [10 to 20] can be analyzed to evaluate the 'if' statement and all values in the ranges [−128 to 9] and [21 to 127] can be used to evaluate the 'else' statement. These values can be, similar to above, evaluated either in a serial manner or in parallel. However, although exploring the entire range of values (e.g., [−128 to 127] for a data type 'char') for a conditional statement (e.g., lines 203-207 in example software code 200) can be a comprehensive method to test software code for defects or bugs, a software programmer may choose a sub-set of values from the range to test the code due to, for example, test time (e.g., evaluation of the software code within a predetermined execution time) and hardware testing constraints (e.g., available memory in a software test system).

Oftentimes, software programs contain nested conditional statements. Nested conditional statements refer to a conditional statement residing within another conditional statement. A person skilled in the relevant art will recognize that nested conditional statements can be evaluated in a similar manner to that described above with respect to steps 130, 132, and 134.

After substantially all program statements in a software code have been evaluated applying the steps described above in method 100 and no program failures have occurred, then method 100 ends at step 170.

In sum, embodiments of the present invention can provide wide code coverage since the embodiments explore a wide range of program. In particular, embodiments of method 100 can analyze a conditional statement and select a set of inputs to evaluate both true and false conditions of the statement. Further, embodiments of method 100 provide a quality assurance engineer an option to select one or more values from a range of values to be evaluated for branches of conditional statements, where the one or more values can be based on, for example and without limitation, test time and testing constraints. These features of method 100 not only provide wide coverage for software code analysis but also minimize false positive errors and reduce the number of false negative errors. In an embodiment, method 100 generates zero false positive errors.

Figure 3:
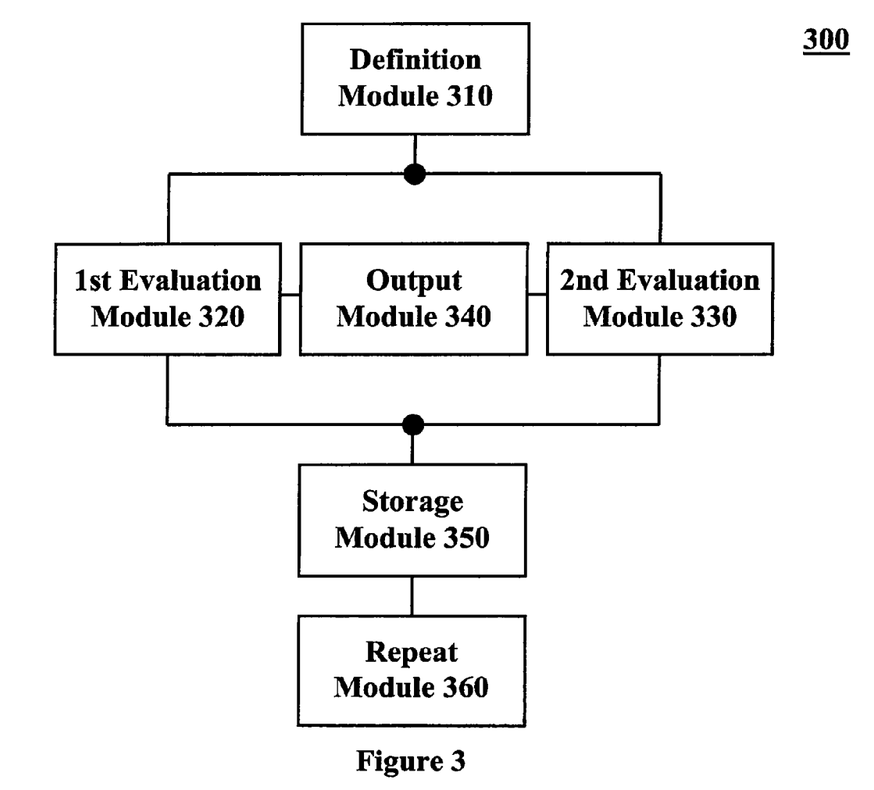
FIG. 3 is an illustration of an embodiment of a system configured to reduce errors in software code.

FIG. 3 is an illustration of an embodiment of a system 300 configured to reduce errors in software code. System 300 includes a definition module 310, a first evaluation module 320, a second evaluation module 330, a storage module 240, and a repeat module 350. An output module (not shown) can be included in system 300, where the output module is configured to output an indication regarding an error in the software code.

Definition module 310 is coupled to first evaluation module 320 and second evaluation module 330. Definition module 310 can be configured to define a range of values for one or more inputs to the software code. In an embodiment, definition module 310 can be configured to set the range of values according to a variable type of the one or more inputs.

First evaluation module 320 can be configured to evaluate a non-conditional statement in the software code with the range of values.

Second evaluation module 330 can be configured to evaluate a conditional statement in the software code with one or more values from the range of values, where true and false conditions of the conditional statement are executed based on the one or more values. In an embodiment, second evaluation module 330 can be configured to branch the execution of the software code by selecting one or more values from the range of values that evaluate the software code on two or more execution paths. In yet another embodiment, second evaluation module 330 can be configured to evaluate a nested conditional statement within the conditional statement with one or more values from the range of values, where true and false conditions of the nested conditional statement are evaluated based on the one or more values. Although first evaluation module and second evaluation module 330 are illustrated in FIG. 3 as two separate modules, one of skill in the relevant art will recognize that a single module can be used to perform both functions.

Output module 340 is coupled to first evaluation module 320 and second evaluation module 330. Output module 340 is configured to output an indication regarding an error in the software code.

Storage module 350 is coupled to first evaluation module 320 and second evaluation module 330. Storage module 350 is configured to store the one or more values used to evaluate the non-conditional and conditional statements in first evaluation module 320 and second evaluation module 330, respectively.

In referring to FIG. 3, repeat module 360 is coupled to storage module 350.

Repeat module 360 can be configured to repeat the evaluation of non-conditional and conditional statements in the software code until a program failure occurs or substantially all statements in the software code have been evaluated.

Figure 4:
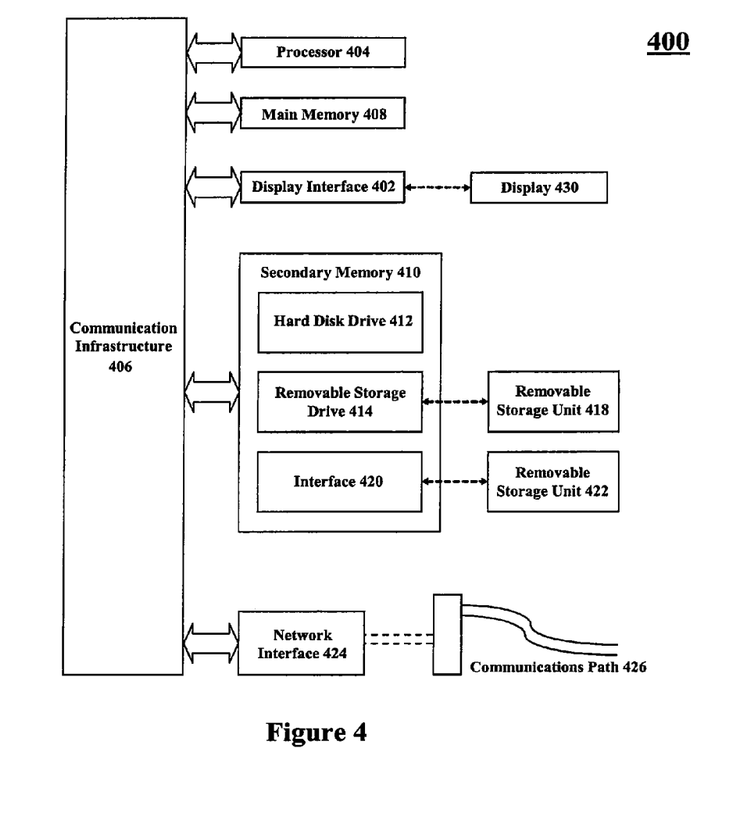
FIG. 4 is an illustration of an example computer system in which the present invention can be implemented.

Various aspects of the present invention may be implemented in software, firmware, hardware, or a combination thereof. FIG. 4 is an illustration of an example computer system 400 in which embodiments of the present invention, or portions thereof, can be implemented as computer-readable code. For example, the methods illustrated by flowchart 100 of FIG. 1 or system 300 of FIG. 3 can be implemented in system 400. Various embodiments of the invention are described in terms of this example computer system 400. After reading this description, it will become apparent to a person skilled in the relevant art how to implement embodiments of the invention using other computer systems and/or computer architectures.

Computer system 400 includes one or more processors, such as processor 404. Processor 404 may be a special purpose or a general purpose processor. Processor 404 is connected to a communication infrastructure 406 (e.g., a bus or network).

Computer system 400 also includes a main memory 408, preferably random access memory (RAM), and may also include a secondary memory 410. Secondary memory 410 can include, for example, a hard disk drive 412, a removable storage drive 414, and/or a memory stick. Removable storage drive 414 can comprise a floppy disk drive, a magnetic tape drive, an optical disk drive, a flash memory, or the like. The removable storage drive 414 reads from and/or writes to a removable storage unit 418 in a well known manner. Removable storage unit 418 can include a floppy disk, magnetic tape, optical disk, etc. which is read by and written to by removable storage drive 414. As will be appreciated by persons skilled in the relevant art, removable storage unit 418 includes a computer-usable storage medium having stored therein computer software and/or data.

In alternative implementations, secondary memory 410 can include other similar devices for allowing computer programs or other instructions to be loaded into computer system 400. Such devices can include, for example, a removable storage unit 422 and an interface 420. Examples of such devices can include a program cartridge and cartridge interface (such as those found in video game devices), a removable memory chip (e.g., EPROM or PROM) and associated socket, and other removable storage units 422 and interfaces 420 which allow software and data to be transferred from the removable storage unit 422 to computer system 400.

Computer system 400 can also include a communications interface 424. Communications interface 424 allows software and data to be transferred between computer system 400 and external devices. Communications interface 424 can include a modem, a network interface (such as an Ethernet card), a communications port, a PCMCIA slot and card, or the like. Software and data transferred via communications interface 424 are in the form of signals which may be electronic, electromagnetic, optical, or other signals capable of being received by communications interface 424. These signals are provided to communications interface 424 via a communications path 426. Communications path 426 carries signals and may be implemented using wire or cable, fiber optics, a phone line, a cellular phone link, a RF link or other communications channels.

In this document, the terms "computer program medium" and "computer-usable medium" are used to generally refer to media such as removable storage unit 418, removable storage unit 422, and a hard disk installed in hard disk drive 412. Computer program medium and computer-usable medium can also refer to memories, such as main memory 408 and secondary memory 410, which can be memory semiconductors (e.g., DRAMs, etc.). These computer program products provide software to computer system 400.

Computer programs (also called computer control logic) are stored in main memory 408 and/or secondary memory 410. Computer programs may also be received via communications interface 424. Such computer programs, when executed, enable computer system 400 to implement embodiments of the present invention as discussed herein. In particular, the computer programs, when executed, enable processor 404 to implement processes of the present invention, such as the steps in the methods illustrated by flowchart 100 of FIG. 1, discussed above. Accordingly, such computer programs represent controllers of the computer system 400. Where embodiments of the invention are implemented using software, the software can be stored in a computer program product and loaded into computer system 400 using removable storage drive 414, interface 420, hard drive 412 or communications interface 424.

Embodiments of the invention are also directed to computer program products including software stored on any computer-usable medium. Such software, when executed in one or more data processing device, causes a data processing device(s) to operate as described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A computer-implemented method to analyze software code, the method comprising:
defining a range of values for one or more inputs to the software code;
sequentially reading lines of the software code and, for each line of software code:
determining if the line of software code includes a conditional statement or a non-conditional statement;
for a non-conditional statement in the line of software code, evaluating the non-conditional statement with one or more values from the range of values;
for a conditional statement in the line of software code:
selecting a first set of values from the range of values to evaluate a first branch of the conditional statement;
evaluating the first branch of the conditional statement in the software code based on the selected first set of values and based on at least one of test time and hardware testing constraints;
selecting a second set of values from the range of values to evaluate a second branch of the conditional statement, the first branch being different from the second branch; and
evaluating the second branch of the conditional statement in the software code based on the selecting a second set of values;
wherein evaluating the first branch and evaluating the second branch comprises analyzing all values in the range of values in the evaluation of the conditional statement; and
outputting an indication regarding an error in the software code based on a result of at least one of the evaluating the non-conditional statement, the evaluating the first branch, or the evaluating the second branch.

2. The computer-implemented method of claim 1, further comprising:
storing the one or more values used to evaluate the non-conditional statement and the first and second sets of values used to evaluate the conditional statement; and
repeating for another non-conditional statement, the evaluating the other non-conditional statement, and, for another conditional statement, the evaluating a first branch of the other conditional statement, and the evaluating a second branch of the other conditional statement until a program misbehavior occurs or substantially all statements in the software code have been evaluated.

3. The computer-implemented method of claim 2, wherein the outputting an indication comprises indicating at least one of a program failure and a memory access error in a computer system that evaluates the software code.

4. The computer-implemented method of claim 1, wherein the evaluating the first branch of the conditional statement further comprises:
evaluating a nested conditional statement within the conditional statement with one or more values from the range of values, wherein the evaluating a nested conditional statement comprises selecting a third set of values from the range of values to evaluate a first branch of the nested conditional statement and selecting a fourth set of values from the range of values to evaluate a second branch of the nested conditional statement.

5. The computer-implemented method of claim 1, wherein the defining a range of values comprises setting the range of values according to a variable type of the one or more inputs.

6. The computer-implemented method of claim 1, wherein the first set of values evaluates the conditional statement as true and the second set of values evaluates the conditional statement as false.

7. The computer-implemented method of claim 1, wherein the evaluating the first branch and the evaluating the second branch comprise branching an execution of the software code by selecting one or more values from the range of values that evaluate the software code on two or more execution paths.

8. The computer-implemented method of claim 7, wherein the branching an execution of the software code comprises executing the software code along a first path with one or more values from the range of values that evaluate the conditional statement as true and along a second path with one or more values from the range of values that evaluate the conditional statement as false.

9. A computer program product encoded on a non-transitory computer-usable storage medium comprising instructions that when executed by a data processing apparatus cause the data processing apparatus to perform operations, the computer program product comprising:
defining a range of values for one or more inputs to the software code;
sequentially reading lines of the software code and, for each line of software code:
determining if the line of software code includes a conditional statement or a non-conditional statement;
for a non-conditional statement in the line of software code, evaluating the non-conditional statement with one or more values from the range of values;
for a conditional statement in the line of software code:
selecting a first set of values from the range of values to evaluate a first branch of the conditional statement;
evaluating the first branch of the conditional statement in the software code based on the selected first set of values and based on at least one of test time and hardware testing constraints;
selecting a second set of values from the range of values to evaluate a second branch of the conditional statement, the first branch being different from the second branch; and
evaluating the second branch of the conditional statement in the software code based on the selected second set of values;
wherein evaluating the first branch and evaluating the second branch comprises analyzing all values in the range of values in the evaluation of the conditional statement; and
outputting an indication regarding an error in the software code based on a result of at least one of the evaluation of the non-conditional statement, the evaluation of the first branch, or the evaluation of the second branch.

10. The computer program product of claim 9, wherein the operations further comprise:
storing the one or more values used to evaluate the non-conditional statement and the first and second sets of values used to evaluate the conditional statement statements; and
repeating for another non-conditional statement, the evaluation of the other non-conditional statement, and, for another conditional statement, the evaluation of a first branch of the other conditional statement, and the evaluation of a second branch of the other conditional statement in the software code until a program failure occurs or substantially all statements in the software code have been evaluated.

11. The computer program product of claim 9, wherein the operations further comprise setting the range of values according to a variable type of the one or more inputs.

12. The computer program product of claim 9, wherein the operations further comprise:
evaluating a nested conditional statement within the conditional statement with one or more values from the range of values,
wherein evaluating a nested conditional statement comprises selecting a third set of values from the range of values to evaluate a first branch of the nested conditional statement and tenth computer readable program code that enables a processor to select a fourth set of values from the range of values to evaluate a second branch of the nested conditional statement.

13. The computer program product of claim 9, wherein the operations further comprise branching an execution of the software code by selecting one or more values from the range of values that evaluate the software code on two or more execution paths.

14. The computer program product of claim 13, wherein the operations further comprise executing the software code along a first path with one or more values from the range of values that evaluate the conditional statement as true and along a second path with one or more values from the range of values that evaluate the conditional statement as false.

15. The computer program product of claim 9, wherein the operations further comprise indicating at least one of a program failure and a memory access error in a computer system that evaluates the software code.

16. A system configured to analyze software code, comprising:
a definition module configured to define a range of values for one or more inputs to the software code;
a reading module sequentially reading lines of the software code;
an assessing module, for each line of software code, determining if the line of software code includes a conditional statement or a non-conditional statement;
a first evaluation module configured to evaluate a non-conditional statement in the software code with one or more values from the range of values, the assessing module executing the first evaluation module for a non-conditional statement in the line of software code;

a second evaluation module configured to:
select a first set of values from the range of values to evaluate a first branch of a conditional statement;
evaluate the first branch of the conditional statement in the software code based on the selected first set of values and based on at least one of test time and hardware testing constraints;
select a second set of values from the range of values to evaluate a second branch of the conditional statement, the first branch being different from the second branch; and
evaluate the second branch of the conditional statement in the software code based on the selected second set of values;
wherein the assessing module executes the second evaluation module for a conditional statement in the line of software code; and
wherein evaluating the first branch and evaluating the second branch comprises analyzing all values in the range of values in the evaluation of the conditional statement; and
an output module configured to output an indication regarding an error in the software code based on a result of at least one of the evaluation of the non-conditional statement, the evaluation of the first branch, or the evaluation of the second branch,
wherein each of the definition module, the reading module, the assessing module, the first evaluation module, the second evaluation module, and the output module is implemented on a processing device.

17. The system of claim 16, further comprising:
a storage module configured to store the one or more values used to evaluate the non-conditional statement and the first and second sets of values used to evaluate the conditional statement statements; and
a repeat module configured to repeat for another non-conditional statement, the evaluation of the other non-conditional statement, and, for another conditional statement, the evaluation of a first branch of the other conditional statement, and the evaluation of a second branch of the other conditional statement until a program failure occurs or substantially all statements in the software code have been evaluated.

* * * * *